(12) United States Patent
Korus

(10) Patent No.: US 8,690,197 B2
(45) Date of Patent: Apr. 8, 2014

(54) BEARING APPARATUS AND METHOD FOR AN IRRIGATION PIVOT STRUCTURE

(71) Applicant: Lindsay Corporation, Omaha, NE (US)

(72) Inventor: Thomas J. Korus, Lindsay, NE (US)

(73) Assignee: Lindsay Corporation, Omaha, NC (US)

( * ) Notice: Subject to any disclaimer, the term of this patent is extended or adjusted under 35 U.S.C. 154(b) by 0 days.

(21) Appl. No.: 13/860,125

(22) Filed: Apr. 10, 2013

(65) Prior Publication Data
US 2013/0221663 A1 Aug. 29, 2013

Related U.S. Application Data

(63) Continuation of application No. 13/196,513, filed on Aug. 2, 2011.

(51) Int. Cl.
*F16L 27/00* (2006.01)

(52) U.S. Cl.
USPC .......................................................... 285/275

(58) Field of Classification Search
USPC .......................... 285/272, 275, 280, 278, 273
See application file for complete search history.

(56) References Cited

U.S. PATENT DOCUMENTS 3,434,742 A 3/1969 Swinney

*Primary Examiner* — David E Bochna
(74) *Attorney, Agent, or Firm* — Hovey Williams LLP

(57) ABSTRACT

A bearing structure for a pivoting irrigation system apparatus having a rotatable vertical section with a plurality of annular assemblies mounted thereon. The assemblies include a plurality of components that are rotatable and non-rotatable with the rotatable vertical section so as to facilitate movement with decreased friction therebetween.

16 Claims, 4 Drawing Sheets

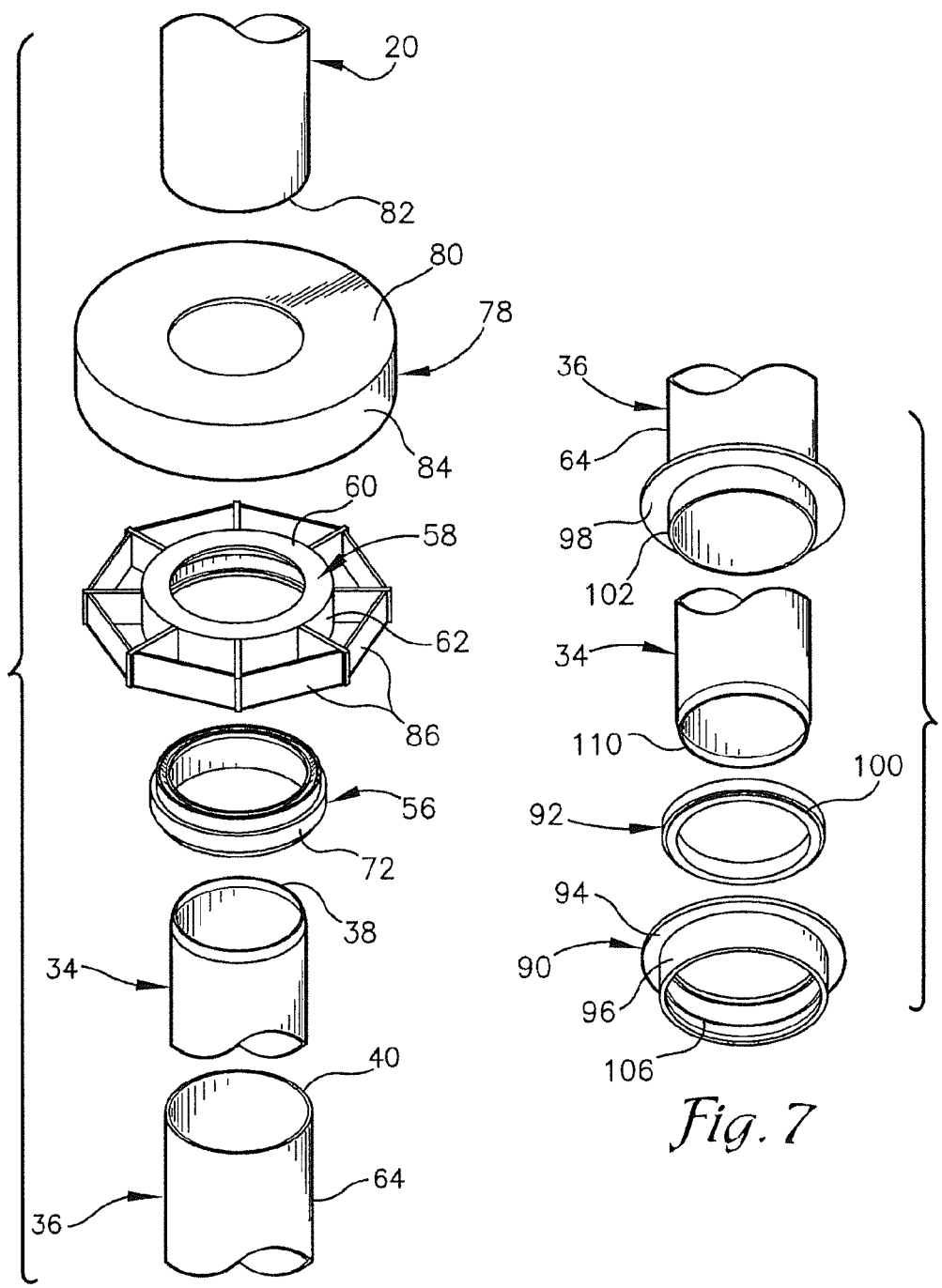

BEARING APPARATUS AND METHOD FOR AN IRRIGATION PIVOT STRUCTURE

RELATED APPLICATIONS

The present application is a continuation of an earlier-filed U.S. non-provisional patent application titled BEARING APPARATUS AND METHOD FOR AN IRRIGATION PIVOT STRUCTURE, Ser. No. 13/196,513, filed Aug. 2, 2011. The present application claims priority benefit of the identified application, and hereby incorporates the identified application by reference into the present application in its entirety.

BACKGROUND

1. Field

Embodiments of the present invention relate to a bearing structure apparatus that facilitates pivoting of a pivoting irrigation system during operation thereof.

2. Discussion of Prior Art

Crops are cultivated throughout the world in a wide variety of climates with different terrains and soils. It is desirable in many of these climates to artificially supplement the climate's natural precipitation via irrigation systems to ensure crops receive adequate water. Additionally, irrigation systems can be used to deliver fertilizers and chemicals to, among other things, promote healthy crop growth, suppress weeds, and protect crops from frost.

Many irrigation systems are hose-fed and/or pipe-fed from one or more hydrants located centrally within or adjacent to a field. Alternatively, water may be ditch-fed by routing water into a ditch that runs along and/or through a field.

The hydrants or ditches are connected by a flexible hose to an overhead high-pressure sprinkler network, which includes an elevated, elongated lateral pipe section that is supported by a plurality of trusses. The lateral pipe section includes a plurality of sprinklers spaced generally along an entire length of the pipe and may extend downward toward the crops to enable distribution of water to the crops from above. Common overhead sprinkler network types include center-pivot systems and lateral-move systems.

Center-pivot systems are ideal for use in fields having circular crop areas and generally include a hydrant located in the middle of each circular crop area. In such systems, an elevated, elongated lateral pipe section with sprinklers extends from a hydrant to an outer circumference of the circular crop area such that the systems may be driven in a generally circular or semi-circular pattern over the crops to deliver water thereto during rotation.

Lateral-move systems are ideal for use in square, rectangular, and irregular-shaped fields. Such systems generally include one or more hydrants located in and/or adjacent to a field and/or one or more ditches located along or through a field that are connected to an elevated, elongated lateral pipe section with sprinklers. Unlike the center-pivot system having a lateral pipe section with a stationary end, the lateral pipe section in a lateral-move system is connected to and extends from a movable cart designed to traverse up and down a cart path. The lateral pipe section may be locked at an angle perpendicular to the cart path and pivot at an end at the cart path, which is desirable if the cart path extends down the middle of a field to enable pivoting from one side of the cart path to the other with each pass along the cart path.

In both center-pivot and lateral-move systems, the lateral pipe section is typically long, for example, twenty to thirty feet, and, in combination with the other components mounted along the lateral pipe section, exerts a significant downward force on the system. Further, due to a cantilever nature of the lateral pipe section, the downward force on the system is not perfectly balanced and is, instead, influenced by a cantilever force. Although hydraulic pressure exerted on the system by fluid running therethrough during use thereof offsets some of the load, pivoting of the lateral pipe section subjects components within conventional systems to considerable wear and tear. Often times, these components determine a time span of such conventional systems between maintenance operations with respect to a maximum number of pivots. Maintenance operations for these components are labor intensive and time consuming, which may result in considerable downtime.

Accordingly, there is a need for a pivoting irrigation system having a structure that minimizes wear and tear between pivoting components by reducing friction and distributing cantilever force, thereby increasing a time span between maintenance operations.

SUMMARY

The following brief summary is provided to indicate the nature of the subject matter disclosed herein. While certain aspects of the present invention are described below, the summary is not intended to limit the scope of the present invention. Embodiments of the present invention provide an irrigation system and method that does not suffer from the problems and limitations of conventional irrigation systems such as those set forth above.

The present invention provides, in its simplest form, a bearing structure apparatus that facilitates pivoting of a pivoting irrigation system during operation thereof with minimized wear and tear between pivoting components by reducing friction and distributing cantilever force.

The aforementioned aspects may be achieved in one aspect of the present invention by providing a bearing structure apparatus for a pivoting irrigation system. The bearing structure apparatus includes a rotatable vertical section of a water-carrying conduit, a first annular assembly mounted on an upper end of the rotatable vertical section, and a second annular assembly mounted on a lower end of the rotatable vertical section.

The first and second annular assemblies may include a plurality of races that are rotatable and non-rotatable with respect to the rotatable vertical section. The apparatus may further include a non-rotatable vertical section of the water-carrying conduit substantially housing and securing the non-rotatable vertical section in an upright position therein. The first annular assembly may include an upper outer race of the plurality of races. The upper outer race may be secured to and rotatable with the rotatable vertical section about an upper inner race that may be secured to the non-rotatable vertical section.

The upper outer race may include an upper engagement ring about an inner perimeter thereof. The upper engagement ring may include a top wall and a depending sidewall operable to slide along the upper inner race. The top wall may extend over the upper inner race and from the rotatable vertical section.

The structure apparatus may further include a bearing between the top wall of the upper engagement ring and the upper inner race operable to facilitate movement between the upper outer race and upper inner race. The bearing may be substantially nested within the upper inner race. The structure apparatus may further include a bearing between the depending sidewall of the upper engagement ring and the upper inner race operable to facilitate movement between the upper outer race and upper inner race. The bearing may be substantially nested within the upper outer race. The upper outer race may include a radiating reinforcement structure extending from the upper engagement ring.

The second annular assembly may include a lower inner race of the plurality of races. The lower inner race may be secured to and rotatable with the rotatable vertical section about a lower outer race that may be secured to the non-rotatable vertical section. The lower outer race may include a lower engagement ring having a top wall and a depending sidewall operable to slide along the lower inner race. The top wall may extend over the lower inner race and from the non-rotatable vertical section. The structure apparatus may further include a bearing between the sidewall of the lower engagement ring and the lower inner race operable to facilitate movement between the lower outer race and lower inner race. The bearing may be substantially nested within the lower outer race.

The aforementioned aspects may further be achieved in another aspect of the present invention by providing a method of pivoting an irrigation system using a bearing structure apparatus. The method may include the steps of providing a rotatable vertical section of a water-carrying conduit, mounting a first annular assembly on an upper end of the rotatable vertical section, and mounting a second annular assembly on a lower end of the rotatable vertical section. The first and second annular assemblies may include a plurality of bearings that are rotatable and non-rotatable with respect to the rotatable vertical section.

The method may further include the step of substantially housing and securing the non-rotatable vertical section of the water-carrying conduit in an upright position via a non-rotatable vertical section. The first annular assembly may include an upper outer race that may be secured to and rotatable with the rotatable vertical section about an upper inner race that may be secured to the non-rotatable vertical section. The upper outer race may include an upper engagement ring about an inner perimeter thereof. The upper engagement ring may have a top wall and a depending sidewall operable to slide along the upper inner race. The top wall may extend over the upper inner race and from the rotatable vertical section.

The method may further include the step of facilitating movement between the upper outer race and upper inner race via a bearing that may be installed between the top wall of the upper engagement ring and the upper inner race. The bearing may be substantially nested within the upper inner race. The method may further include the step of facilitating movement between the upper outer race and upper inner race via a bearing that may be installed between the depending sidewall of the upper engagement ring and the upper inner race. The bearing may be substantially nested within the upper outer race. The upper outer race may include a radiating structure extending from the upper engagement ring.

The second annular assembly may include a lower inner race that may be secured to and rotatable with the rotatable vertical section about a lower outer race that may be secured to the non-rotatable vertical section. The lower outer race may include a lower engagement ring having a top wall and a depending sidewall operable to slide along the lower inner race. The top wall may extend over the lower inner race and from the non-rotatable vertical section. The method may further include the step of facilitating movement between the lower outer race and lower inner race via a bearing that may be between the sidewall of the lower engagement ring and the lower inner race. The bearing may be substantially nested within the lower outer race.

Additional aspects, advantages, and utilities of the present invention will be set forth in part in the description which follows and, in part, will be obvious from the description, or may be learned by practice of the present invention.

BRIEF DESCRIPTION OF THE DRAWINGS

Embodiments of the present invention are described in detail below with reference to the attached drawing figures, wherein:

FIG. 5 is an exploded perspective view of the water-carrying conduit of the system illustrated in FIG. 1, illustrating a first annular assembly;

FIG. 7 is an exploded perspective view of the water-carrying conduit of the system illustrated in FIG. 1, illustrating a second annular assembly.

Figure 1:
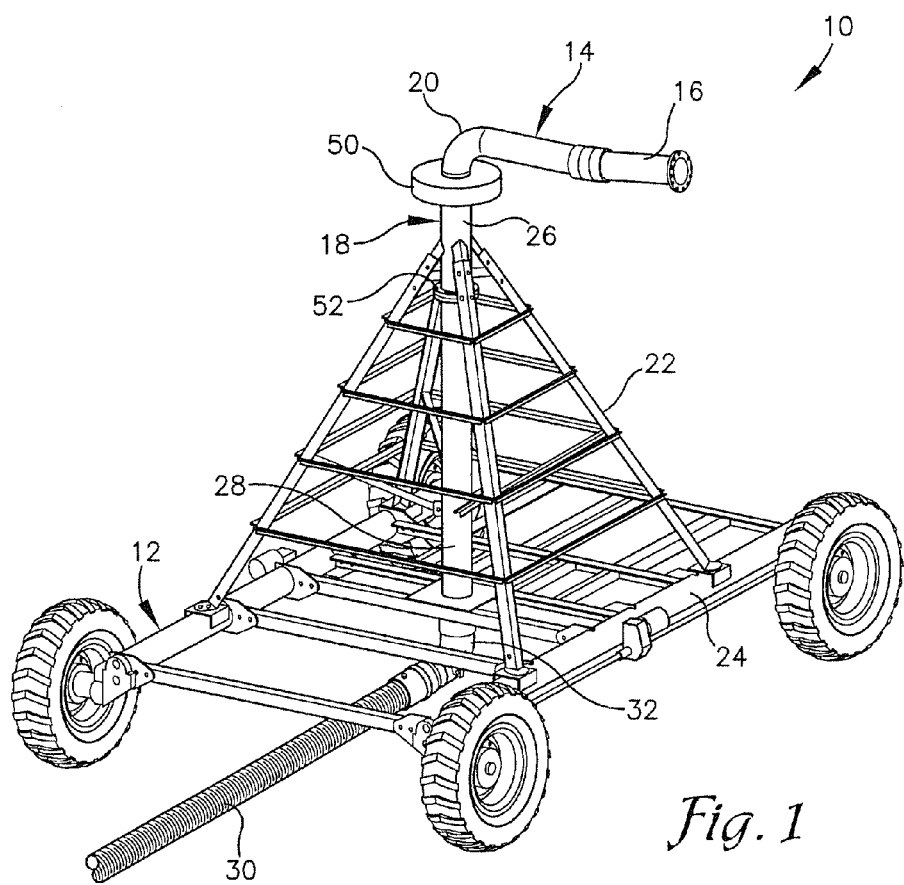
FIG. 1 is a rear right side perspective view of a moveable cart of a pivoting irrigation system having a water-carrying conduit, in accordance with an exemplary embodiment of the present invention.
Figure 2:
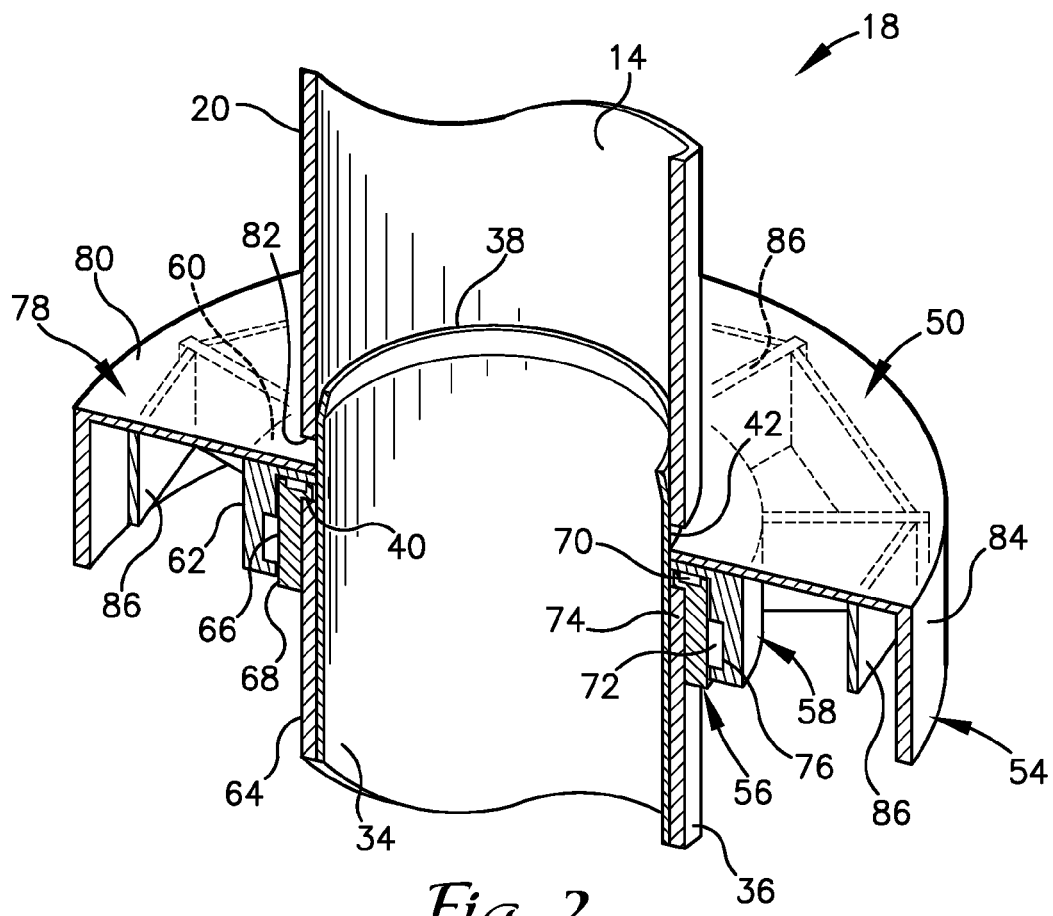
FIG. 2 is a vertical cross-sectional perspective view of the water-carrying conduit of the system illustrated in FIG. 1, illustrating a first annular assembly.
Figure 3:
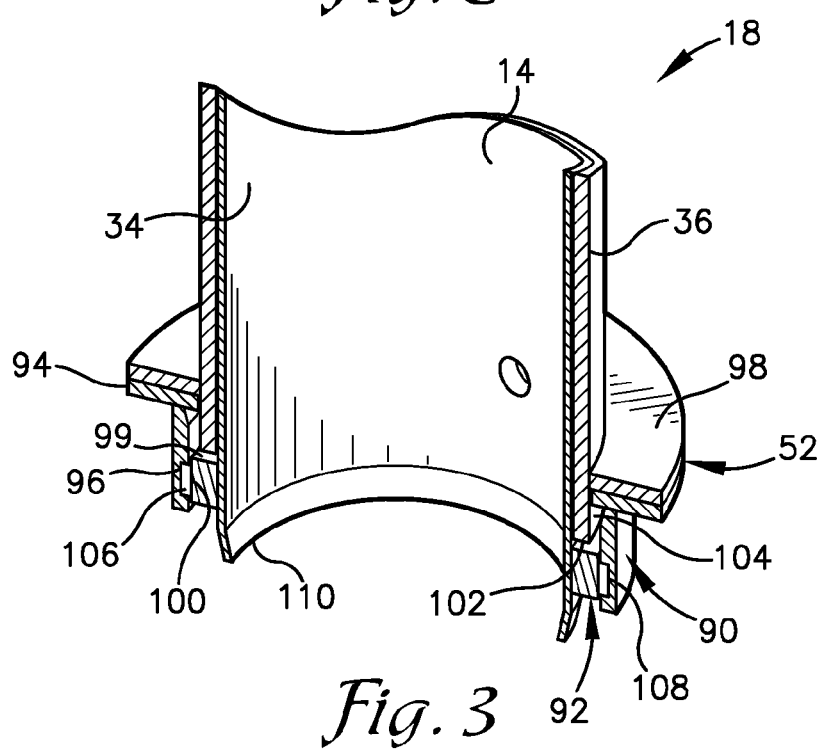
FIG. 3 is a vertical cross-sectional perspective view of the water-carrying conduit of the system illustrated in FIG. 1, illustrating a second annular assembly.
Figures 4, 6:
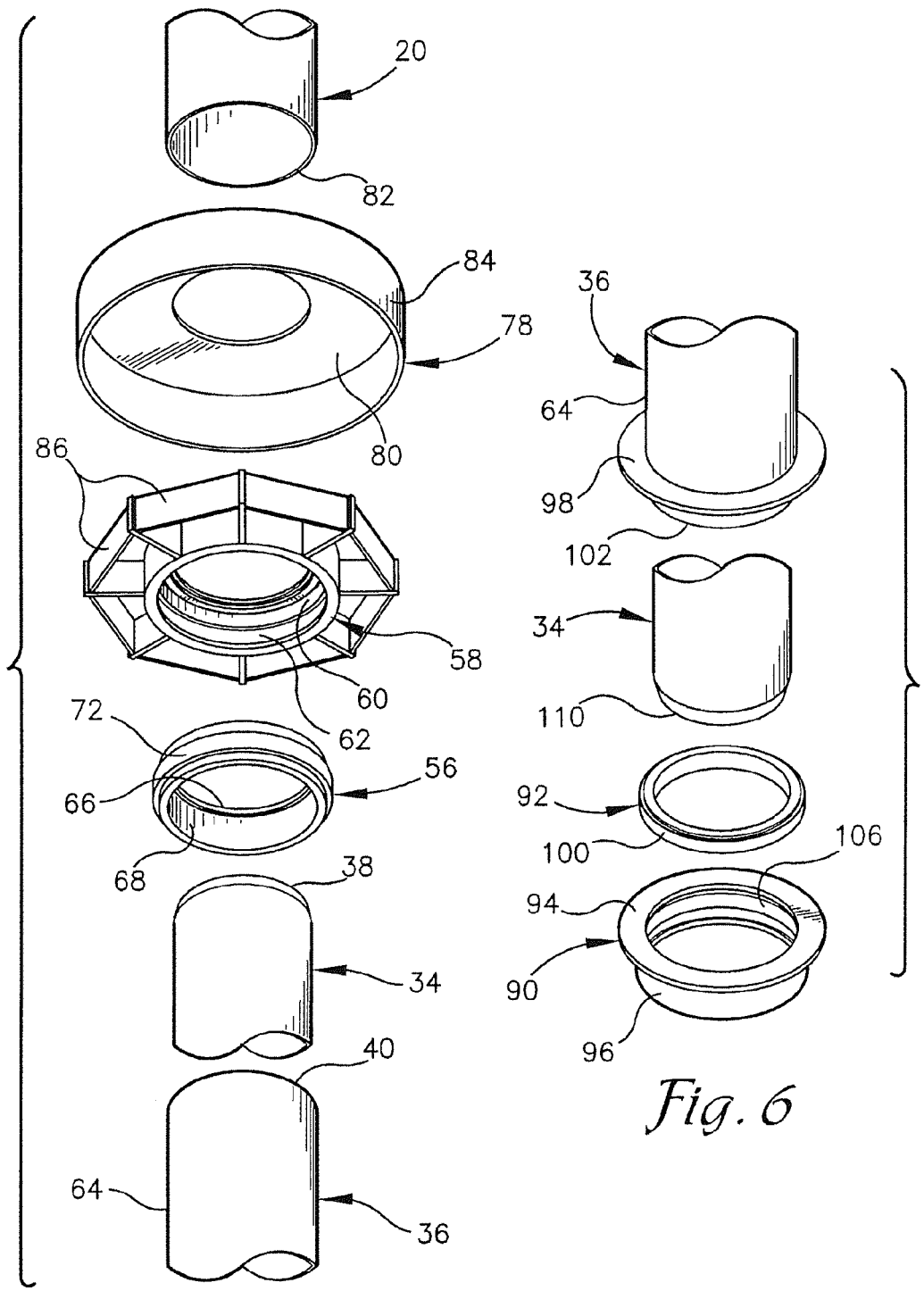
FIG. 4 is an exploded perspective view of the water-carrying conduit of the system illustrated in FIG. 1, illustrating a first annular assembly.
FIG. 6 is an exploded perspective view of the water-carrying conduit of the system illustrated in FIG. 1, illustrating a second annular assembly.

The drawing figures do not limit the present invention to the specific embodiments disclosed and described herein. The drawings are not necessarily to scale, emphasis instead being placed upon clearly illustrating the principles of the present invention.

DETAILED DESCRIPTION

The following detailed description of embodiments of the invention references the accompanying drawings. The embodiments are intended to describe aspects of the invention in sufficient detail to enable those skilled in the art to practice the invention. Other embodiments can be utilized and changes can be made without departing from the scope of the claims. The following detailed description is, therefore, not to be taken in a limiting sense. The scope of the present invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Turning now to the drawing figures, FIG. 1 illustrates an end portion of a moveable pivoting irrigation system 10 mounted to a moveable cart 12, in accordance with embodiments of the present invention. For purposes of describing aspects of the present invention, the pivoting irrigation system 10 is illustrated with a lateral-move system. It is foreseen, however, that the pivoting irrigation system 10 could be used with a stationary structure, such as, a center-pivot irrigation system (not illustrated) without deviating from the scope of the present invention.

The pivoting irrigation system 10 includes a distribution pipe or water-carrying conduit 14 for distributing fluid and/or solids suspended in fluids including fertilizers and pesticides (hereinafter "fluids") to crops in a field. The water-carrying conduit 14 includes a lateral section 16 and a vertical section 18 connected by an upper elbow joint 20. The vertical section 18 is secured in an upright position by a tower assembly 22 that extends from a base 24 of the cart 12 and secures to the vertical section 18 at upper and lower ends 26, 28 thereof. The lower end 28 of the vertical section 18 is connected to a flexible pipeline 30 at a lower elbow joint 32, which connects the water-carrying conduit 14 to a water source (not illustrated) and is operable to be drug behind the cart 12. Additional details of the system 10, particularly with respect to the cart 12, are shown in U.S. patent application Ser. Nos. 13/042, 192 and 13/043,138, which are hereby incorporated by reference in their entireties.

Turning to FIGS. 2-7, adjacent to the upper end 26 of the vertical section 18 of the water-carrying conduit 14 is a rotatable pipe section 34 substantially housed within a non-rotatable pipe section 36. Both sections 34, 36 are manufactured of hot-dipped galvanized steel with the rotatable pipe section 34 having a smaller diameter than the non-rotatable pipe section 36. In the exemplary embodiment, the rotatable pipe section 34 has an inner diameter of approximately 8 inches and the non-rotatable pipe section 36 having an inner diameter of approximately 8.175 inches. It is foreseen, however, that one or both of the diameters may vary from these approximations as long as the rotatable pipe section 34 fits within the non-rotatable pipe section 36.

An upper end 38 of the rotatable pipe section 34 extends out of the non-rotatable pipe section 36, past an upper end 40 thereof, and into the upper elbow joint 20. The rotatable pipe section 34 is secured to the upper elbow joint 20 via welding or the like, thus forming a watertight seal therebetween. Additionally, the upper end 38 is tapered to facilitate a secure connection between the rotatable pipe section 34 and the upper elbow joint 20. The upper elbow joint 20 is sized and shaped to mate with the upper end 38 of the rotatable pipe section 34 by fitting over the upper end 38, sliding partially downward, and resting thereon so that a portion 42 of the rotatable pipe section 34 is exposed by the upper elbow joint 20. In this manner, the upper elbow joint 20 is operable to rotate with the rotatable pipe section 34 during operation of the system 10. The portion 42 provides a vertical tolerance to accommodate settling of the upper elbow joint 20 onto the rotatable pipe section 34 along with any weld distortions or the like therebetween.

Spaced on either end 38 the rotatable and non-rotatable pipe sections 34, 36 and secured thereto are first and second annular assemblies 50, 52. The first annular assembly includes an upper outer race 54 and an upper inner race 56. The upper outer race 54 includes an engagement ring 58 about an inner perimeter thereof. The engagement ring 58 includes a top wall 60 and a sidewall 62 depending downward along an exterior surface 64 of the non-rotatable pipe section 36. The top wall 60 of the upper outer race 54 extends from the rotatable pipe section 34 so that the upper outer race 54 is operable to rotate therewith during operation of the system 10.

The upper inner race 56 spaces the upper outer race 54 from the non-rotatable pipe section 36, and includes a top wall 66 and a sidewall 68 that are operable to slide along, either abuttingly or slightly spaced therefrom, the upper outer race 54 and particularly the respective top wall 60 and sidewall 62 thereof. The top wall 66 of the upper inner race 56 extends inward and rests on the upper end 40 of the non-rotatable pipe section 36, and is stationary therewith during operation of the system 10. The top wall 66 of the upper inner race 56 is spaced from the rotatable pipe section 34 to avoid interference between the upper inner race 56 and the rotatable pipe section 34 during rotation of the rotatable pipe section 34, for instance, to accommodate any weld distortions or the like in the rotatable pipe section 34. In the exemplary embodiment, the space between the top wall 66 of the upper inner race 56 and the rotatable pipe section 34 is five to fifteen millimeters.

Between the upper outer race and inner race 54, 56 are a top thrust bearing 70 and a radial or side slide bearing 72 to facilitate sliding movement therebetween. The bearings 70, 72 may be manufactured from a medium weave fabric with high mechanical strength and dimensional stability when immersed in water, acid, or chemical solutions, and having a static coefficient of friction dry at $15N/mm^2/2180\ lb/in^2$ of preferably between 0.1 and 0.25, and more preferably between 0.15 and 0.18. For example, the thrust bearing 70 may be made from molybdenum disulphide and polytetrafluoroethylene plastic to enable use of the thrust bearing 70 in a dry, non-lubricated environment.

The top bearing 70 is nested within a groove 74 in the top wall 66 of the upper inner race 56 to operably slide along, either abuttingly or slightly spaced therefrom, the top wall 60 of the upper outer race 54. The side bearing 72 is nested within a groove 76 in the sidewall 62 of the upper outer race 54 to slidably abut the sidewall 68 of the upper inner race 56. In this manner, the bearings 70, 72 absorb at least a portion of the load between the upper outer race and inner race 54, 56 so that movement is facilitated therebetween. It is foreseen that the either or both of the bearings 70, 72 could be nested within one or more grooves (not illustrated) in one or both of the upper outer race and inner race 54, 56 without deviating from the scope of the present invention.

The upper outer race 54 includes a radiating structure 78 having a top wall 80 that extends from the rotatable pipe section 34, along the top wall 60 of the upper outer race 54, and radially therefrom. In this manner, the radiating structure 78 is operable to rotate with the rotatable pipe section 34. The top wall 80 of the radiating structure 78 is sufficiently spaced from a lower end 82 of the upper elbow joint 20 so as to permit secure engagement of the upper elbow joint 20 onto the upper end 38 of the rotatable pipe section 34, which contributes to the exposure of the portion 42, as previously discussed.

Depending from the top wall 80 of the radiating structure 78 is an annular skirt 84. The top wall 80 and the skirt 84 substantially house the upper outer race and inner race 54, 56. Thus, the upper outer race and inner race 54, 56 are substantially protected from the elements, and may be formed from grey iron casting material or like material that is affordable, machinable, and does not require a finish due to its protection via the top wall 80 of the radiating structure 78.

The radiating structure 78 further includes a webbed reinforcement network 86 extending about the skirt 84 and the engagement ring 58, thereby assuming an octagon shape. The network 86 increases the structural integrity of the first annular assembly 50 and maintains a center position of the rotatable and non-rotatable sections 34, 36 with respect to each other during use of the system 10.

The second annular assembly 52 includes a lower outer race 90 and a lower inner race 92. The lower outer race 90 includes a top wall 94 and a depending sidewall 96. In the exemplary embodiment, the top wall 94 is welded to an annular flange 98 of the non-rotatable pipe section 36. The flange 98 extends from and is welded to the exterior surface 64 of the non-rotatable pipe section 36. In this manner, assembly of the second annular assembly 52 to the non-rotatable pipe section 36 is facilitated and the connection therebetween is reinforced. Additionally, the flange 98 provides an engagement point between the upper and lower ends 26, 28 of the vertical section 18 and maintains a center position of the rotatable and non-rotatable sections 34, 36 with respect to each other during use of the system 10 in cooperation with the network 86.

The lower inner race 92 is secured to the rotatable pipe section 34 so as to rotate therewith during operation of the system 10. The lower inner race 92 includes a top wall 99 and a sidewall 100. The top wall 99 of the lower inner race 92 is sufficiently spaced from a lower end 102 of the non-rotatable pipe section 36 so as not to contact or otherwise interfere with the non-rotatable pipe section 36 during rotation with the rotatable pipe section 34. The sidewall 100 of the lower inner race 92 is operable to slide along, either abuttingly or slightly spaced therefrom, the lower outer race 90 and particularly the sidewall 96 thereof. In this manner, a compartment 104 is formed between the lower outer race and inner race 90, 92 that may be at least partially filled with a lubricant (not illustrated) or the like to facilitate movement between the lower outer race and inner race 90, 92.

Between the lower outer race and inner race 90, 92 is a radial or side slide bearing 106 to facilitate sliding movement therebetween. The side bearing 106 is made of the same or similar material as bearings 70, 72, and is nested within a groove 108 in the sidewall 96 of the lower outer race 90 to slidably abut the sidewall 100 of the lower inner race 92. In this manner, the side bearing 106 absorbs at least a portion of the load between the lower outer race and inner race 90, 92 so that movement is facilitated therebetween. It is foreseen that the side bearing 106 could be nested within a groove (not illustrated) in one or both of the lower outer race and inner race 90, 92 without deviating from the scope of the present invention.

Depending from the second annular assembly 52 is an end 110 of the rotatable pipe section 34. The end 110 is tapered to avoid interference between the rotatable pipe section 34 and the lower end 28 of the vertical section 18 during operation of the system 10.

In use, the cart 12 traverses a cart path (not illustrated) with the water-carrying conduit 14 activated and moving laterally with respect to the cart 12 so that crops (not illustrated) in a field (not illustrated) adjacent to the cart path may be irrigated. During traverse, the lateral section 16 of the water-carrying conduit 14 remains in a fixed position with respect to the cart 12 until the cart 12 reaches an end of a traversed cart path. At this point, it is typically desirable to pivot the system 10 to irrigate crops on the other side of the cart path as well as crops along a half-circle (not illustrated) therebetween.

To pivot the system 10, the lateral section 16 is driven while the cart 12 remains stationary. The distance of the pivot is typically 180 degrees to the other side of the cart path. Driving the lateral section 16 causes rotation of the upper elbow joint 20 and the rotatable pipe section 34 with respect to non-rotatable pipe section 36. The bearings 70, 72, and bearing 106 of the respective first and second annular assemblies facilitate rotation by sharing the load between the rotatable and non-rotatable pipe sections 34, 36 and distributing the cantilever force of the lateral section 16 along the rotatable and non-rotatable pipe sections 34, 36 and between the first and second annular assemblies 50, 52. Additionally, the bearings 70, 72, and 106 have an increased lifespan because they are not situated in or otherwise exposed to fluid within the water-carrying conduit 14.

In this manner, the present invention provides an efficient method and apparatus operable to decrease friction and absorb cantilever force during pivot of the irrigation system 10, thus increasing a time span between maintenance operations required by the irrigation system 10. Although the present invention has been described with reference to the preferred embodiment illustrated in the attached drawing figures, it is noted that equivalents may be employed and substitutions made herein without departing from the scope of the present invention as recited in the claims.

Having thus described the preferred embodiment of the present invention, what is claimed as new and desired to be protected by Letters Patent includes the following:

The invention claimed is:

1. A bearing structure apparatus for a pivoting irrigation system, the bearing structure apparatus comprising:
   a rotatable vertical section of a water-carrying conduit, the rotatable section including a first cylindrical sidewall presenting an inner surface and an outer surface, and defining a first longitudinal axis;
   a non-rotatable vertical section of the water-carrying conduit, the non-rotatable section including a second cylindrical sidewall presenting an inner surface adjacent to the outer surface of the rotatable vertical section, and defining a second longitudinal axis coaxially aligned with the first longitudinal axis;
   a first annular assembly including a first race mounted on the rotatable vertical section and a second race mounted on the non-rotatable vertical section, the first race rotatably connected to the second race; and
   a second annular assembly including a third race mounted on the rotatable vertical section and a fourth race mounted on the non-rotatable vertical section, the third race rotatably connected to the fourth race,
   wherein the first cylindrical sidewall defines an outside diameter and the second cylindrical sidewall defines an inside diameter, the outside diameter of the first sidewall is smaller than the inside diameter of the second sidewall, and the rotatable vertical section is housed substantially within the non-rotatable vertical section; and
   wherein the inner surface and the outer surface of the rotatable vertical section have inwardly tapered ends.

2. The bearing structure apparatus as set forth in claim 1, wherein the first race is mounted on an upper end of the rotatable vertical section, the second race is mounted on an upper end of the non-rotatable vertical section, the third race is mounted on a lower end of the rotatable vertical section, and the fourth race is mounted on a lower end of the rotatable vertical section.

3. The bearing structure apparatus as set forth in claim 2, wherein the rotatable vertical section defines a longitudinal length and a horizontal diameter, and the longitudinal length is at least two times the horizontal diameter.

4. The bearing structure apparatus as set forth in claim 1, wherein the inside diameter of the second cylindrical sidewall is approximately 8.175 inches, and the first cylindrical sidewall has a wall thickness of approximately 0.175 inches.

5. The bearing structure apparatus as set forth in claim 1, wherein the annular assemblies each include at least one bearing, each bearing is operable to be subjected to vertical, horizontal, torsional, and/or rotational loads, and the bearings are collectively configured to evenly receive the loads.

6. A bearing structure apparatus for a pivoting irrigation system, the bearing structure apparatus comprising:
- a rotatable vertical section of a water-carrying conduit, the rotatable section including a first cylindrical sidewall presenting an inner surface, and defining a first longitudinal axis;
- a non-rotatable vertical section of the water-carrying conduit, the non-rotatable section including a second cylindrical sidewall presenting an inner surface and an outer surface adjacent to the inner surface of the rotatable vertical section, and defining a second longitudinal axis coaxially aligned with the first longitudinal axis;
- a first annular assembly including a first race mounted on the rotatable vertical section and a second race mounted on the non-rotatable vertical section, the first race rotatably connected to the second race; and
- a second annular assembly including a third race mounted on the rotatable vertical section and a fourth race mounted on the non-rotatable vertical section, the third race rotatably connected to the fourth race,
- wherein the first cylindrical sidewall defines an inside diameter and the second cylindrical sidewall defines an outside diameter, the inside diameter of the first sidewall is larger than the outside diameter of the second sidewall, and the non-rotatable vertical section is housed substantially within the rotatable vertical section; and
- wherein the inner surface and the outer surface of the non-rotatable vertical section have inwardly tapered ends.

7. The bearing structure apparatus as set forth in claim 6, wherein the inside diameter of the second cylindrical sidewall is approximately 8.175 inches, and the first cylindrical sidewall has a wall thickness of approximately 0.175 inches.

8. The bearing structure apparatus as set forth in claim 6, wherein the annular assemblies each include at least one bearing, each bearing is operable to be subjected to vertical, horizontal, torsional, and/or rotational loads, and the bearings are collectively configured to evenly receive the loads.

9. A bearing structure apparatus for a pivoting irrigation system, the bearing structure apparatus comprising:
- a rotatable vertical section of a water-carrying conduit, the rotatable section including a first cylindrical sidewall presenting an inner surface and an outer surface, and defining a first longitudinal axis;
- a non-rotatable vertical section of the water-carrying conduit, the non-rotatable section including a second cylindrical sidewall presenting an inner surface adjacent to the outer of the rotatable vertical surface, and defining a second longitudinal axis coaxially aligned with the first longitudinal axis;
- a first annular assembly including a first race mounted on an upper end of the rotatable vertical section; a second race mounted on an upper end of the non-rotatable vertical section, the first race rotatably connected to the second race; and a first bearing communicatively connected to the first race and the second race, to facilitate relative rotation therebetween; and
- a second annular assembly including a third race mounted on a lower end of the rotatable vertical section; a fourth race mounted on a lower end of the non-rotatable vertical section, the third race rotatably connected to the fourth race; and a second bearing communicatively connected to the third race and the fourth race, to facilitate relative rotation therebetween,
- wherein the first cylindrical sidewall defines an outside diameter and the second cylindrical sidewall defines an inside diameter, the outside diameter of the first sidewall is smaller than the inside diameter of the second sidewall, and the rotatable vertical section is housed substantially within the non-rotatable vertical section;
- wherein the inner surface and the outer surface of the rotatable vertical section have inwardly tapered ends; and
- wherein the first bearing and the second bearing are radial bearings.

10. The bearing structure apparatus as set forth in claim 9, wherein the first race presents an outer surface and the second race presents an inner surface facing the outer surface of the first race; the first bearing is disposed between the outer surface of the first race and the inner surface of the second race; the third race presents an outer surface and the fourth race presents an inner surface facing the outer surface of the third race; and the second bearing is disposed between the outer surface of the third race and the inner surface of the fourth race.

11. The bearing structure apparatus as set forth in claim 9, wherein the first annular assembly further includes a first thrust bearing, the first race presents an upper surface and the second race presents a lower surface facing the upper surface of the first race, and the first thrust bearing is disposed between the upper surface of the first race and the lower surface of the second race.

12. The bearing structure apparatus as set forth in claim 11, wherein the upper and lower surfaces each include a groove for receiving and aligning the respective bearings.

13. The bearing structure apparatus as set forth in claim 9, wherein each bearing is operable to be subjected to vertical, horizontal, torsional, and/or rotational loads, and the bearings are collectively configured to evenly receive the loads.

14. The bearing structure apparatus as set forth in claim 9, wherein the first race and the second race are slightly spaced from each other, and the third race and the fourth race are slightly spaced from each other.

15. The bearing structure apparatus as set forth in claim 9, wherein the bearings each have a static coefficient of friction of between 0.1 and 0.25.

16. The bearing structure apparatus as set forth in claim 15, wherein the bearings are formed of molybdenum disulphide and polytetrafluoroethylene plastic.

* * * * *